United States Patent [19]

Green et al.

[11] 4,161,545

[45] Jul. 17, 1979

[54] HONEY COATED ROASTED NUT PRODUCT AND METHOD FOR MAKING SAME

[76] Inventors: William M. Green, Box 535, Robersonville, N.C. 27871; Maurice W. Hoover, 920 Merwin Rd., Raleigh, N.C. 27606

[21] Appl. No.: 906,663

[22] Filed: May 16, 1978

[51] Int. Cl.² .............................................. A23L 1/36
[52] U.S. Cl. ..................................... 426/93; 426/293; 426/305; 426/309; 426/629; 426/632
[58] Field of Search ................. 426/93, 293, 629, 632, 426/639, 309, 305

[56] References Cited

U.S. PATENT DOCUMENTS

| | | | |
|---|---|---|---|
| 3,063,843 | 11/1962 | Hashimoto | 426/93 |
| 3,294,549 | 12/1966 | Vix | 426/632 |
| 3,740,236 | 6/1973 | Baxley | 426/293 X |
| 3,876,811 | 4/1975 | Bonner | 426/309 |
| 4,089,984 | 5/1978 | Gilbertson | 426/293 |

*Primary Examiner*—Jeanette M. Hunter
*Attorney, Agent, or Firm*—Roylance, Abrams, Berdo & Farley

[57] ABSTRACT

There is disclosed a honey coated roasted nut product which is prepared by first coating raw nuts with a mixture of honey and water. The honey coated nuts are then enrobed with a dry mixture of sugar and starch and the nuts are then roasted. After cooling, the nuts may be salted.

9 Claims, No Drawings

HONEY COATED ROASTED NUT PRODUCT AND METHOD FOR MAKING SAME

This invention relates to a honey coated roasted nut product and to a process for making such a product.

It is known in the art to provide nuts with various sweetened coatings. For example, U.S. Pat. No. 4,053,650 to Chino et al discloses a process whereby nuts are coated with an aqueous gum solution containing sugar which are then baked. U.S. Pat. No. 3,063,843 to Hashimoto discloses coating raw nuts with a sugar syrup, roasting the nuts and thereafter coating them with a sauce comprising soy sauce, salt, sugar and water. U.S. Pat. No. 3,671,266 to Cooper et al discloses a process for producing a sorbitol coated nut product which comprises coating raw nuts with an aqueous sorbitol solution, thereafter roasting the nuts and cooling. However, it has been found that such materials do not give a wholly satisfactory product. Thus, an undesirable dark brown color is obtained when a dextrose or corn syrup solution is applied to nuts and the nuts are then roasted, whereas sucrose and dextrins result in a light colored product which does not have a desirable eye appeal. Moreover, the flavor of such coated nuts is not always satisfactory.

It has been suggested in the art to apply honey to a nut product as a flavoring agent, see U.S. Pat. No. 3,294,549. According to the teachings of this patent, raw nuts are pressed to remove a portion of the oil content, the nuts are reconstituted in an aqueous solution which may contain a flavoring agent such as honey, the reconstituted flavored nut meats are then dried, the dried product is roasted and the resultant reconstituted, dry, partially defatted nuts are then salted and/or treated with other flavoring agents.

It is an object of this invention to provide a nut product which has a more desirable color than does a nut product which has been coated with dextrose, corn syrup, sucrose, dextrin, etc.

It is another object of this invention to provide a coated nut product having an improved flavor to that obtained when other sweeteners are used.

It is yet another object of this invention to provide a coating which is much more adhesive than is obtained when nuts are coated with dextrose, corn syrup, dextrins and the like.

These and other objects are accomplished by the practice of this invention which, briefly, comprises first coating raw nuts with a mixture of honey and water. The honey coated nuts are then enrobed with a dry mixture of sugar and starch by blending these ingredients and the nuts are then roasted. After cooling, the nuts may be dusted with salt or a blend of salt and sugar.

Nuts which may be treated in accordance with the practice of this invention include peanuts, cashews, almonds, pecans and other edible nuts from which the shells have been removed. The nuts may first be blanched to remove the skins or used with the skins still on. The nuts to be treated are placed in a suitable mixing apparatus, such as a revolving pan or cylinder, so as to give a smooth, evenly coated product.

Honey is diluted with water, preferably warm water, to give a mixture comprising from 40 to 70% by weight and preferably from 50 to 55% by weight of soluble solids. Since Grade A honey normally contains from about 80 to 83% by weight soluble solids, the honey applied to the nuts should be diluted so that the coating mixture will comprise about 50–80% by weight of honey and from about 20–50% by weight of water. This coating solution is added to the nuts in the mixing container and the nuts are tumbled in the container to allow the honey solution to evenly coat the nuts. From about 2 to 5% by weight of the honey solution based upon the weight of the nuts is used.

After the nuts are evenly coated with the honey solution, from about 8 to 16% by weight of the sugar-starch mixture based on the weight of the nuts is added to the tumbling nuts. The sugar-starch mixture contains from about 84 to 92% by weight of sugar and from about 8 to 16% by weight of starch. The particle size of the sugar and the starch in the dry mixture is 0.002-inch to 0.02-inch. The sugar-starch mixture is added to the honey coated nuts to cause them to tumble freely without adhering to each other. The coated nuts are then roasted, either by submersion in oil heated to a temperature of from about 300° to 375° F. or by placing them on a continuous belt and passing them through an air roaster at a temperature of from about 300°–375° F. until the desired roast is obtained. Air roasting is usually done by conveying the product through an oven, using a foraminous belt, and passing air, either downwardly or upwardly, through the bed of product on the belt in the oven. Typically, the bed of nuts on the belt would be 2 inches deep, though 1–4 inches is usual. The belt could be perforated stainless steel, for example. In either case, the hot roasted product is cooled as quickly as possible, such as by forced air, to prevent excessive roasting. From about 0.3 to 1.0% by weight of salt based upon the weight of the nuts or a blend of salt and sugar is added to the cooked product and the roasted nuts are packaged and sealed, preferably in a low oxygen atmosphere obtained by a vacuum or inert gas such as nitrogen or carbon dioxide.

It is important in carrying out the practice of this invention that the amount of granulated sugar and starch imposed on the honey coating be at the proper ratio, one to the other, and also that the sieve size of the sugar and starch be within the recited range of 0.002-inch to 0.02-inch.

If the granulated sugar is too fine, such as that found in XXX powdered sugar, the nuts do not coat and remain coated as well as they do when the sugar crystals are within the size specification of 0.002- to 0.02-inches. If the sugar crystal is larger than 0.02-inches in diameter, the coating will be uneven and will not adhere properly to the nuts.

It is important that the sugar-starch ratio be within the proper range. The addition of starch in the proper ratio causes the coating to stick better and more evenly when applied to the honey coated nuts. If the starch is too high with respect to the sugar, then the coating becomes too dry and will tend to flake off more readily during roasting. On the other hand, if the sugar is too high in respect to the starch, the coated nuts will tend to stick together before and during roasting, thus causing large clumps to develop.

Under certain circumstances, such as where the solids content of the honey coating solution is on the low side of the 40–70% range, it may be advantageous to combine an adhesive coating agent with the honey solution. The adhesive agent may consist of natural or derived vegetable gums such as malto-dextrin, dextrins, natural or derived edible polymers, gum arabic, guar, cellulose derivatives, etc. When an adhesive agent is added to the honey solution, the nuts are treated as previously described.

There are several advantages to the use of honey as a coating for hot nuts, as opposed to sucrose, dextrose, corn syrup or dextrins. Thus, the honey aids in imparting a good golden honey color to the finished product as compared to a dark brown color which is obtained with a dextrose or corn syrup solution is applied to the nuts. Sucrose and dextrose give a light colored product that does not have the eye appeal obtained with honey. Moreover, the honey imparts a very pleasing and delightfully different flavor to the product that is not obtained when other sweeteners are used. Further, honey exhibits an adhesiveness not found with other sweeteners and adhesives commonly used. Thus, the honey causes the granulated sugar and starch blend to adhere better to the nuts than is the case when either a sugar solution or a starch derivate such as dextrose, corn syrup or dextrins is used.

When the honey is applied to peanuts, from which the skins have not been removed the honey causes the skins to stick better to the nuts, thus resulting in the finished roasted product being more attractive due to the skin's being more uniformly attached. Also, if there are any breaks in the skins of the nuts, the golden color of the roasted nut and reddish skins blend together better as one color than is the case when honey is not used.

The following examples illustrate the practice of this invention:

EXAMPLE 1

100 pounds of peanuts are placed in a revolving coating pan and as the nuts tumble, 3.75 pounds of a honey coating solution is added. The honey coating solution contains 64% by weight of honey and 36% by weight of water. The soluble solids in the honey solution is 52% by weight. Tumbling is continued until all of the nuts are coated evenly. Then, 12.25 pounds of a dry sugar-starch blend are added to the coating pan. The dry blend comprises 88% by weight of sugar and 12% by weight of starch and the average particle size of the blend is 0.010-inch. The nuts are again allowed to tumble until evenly coated with the sugar-starch mixture. The coated nuts are then submerged in an oil bath and roasted at a temperature of about 340° F. until the desired roast is obtained. The roasting operation generally takes from about 3 to 5 minutes. The roasted nuts are then air cooled to prevent excessive roasting.

EXAMPLE 2

A 10% by weight dextrin gum solution is prepared with hot water. Then a 2:1 by weight blend of honey and dextrin gum solution is prepared and 4 pounds of this solution is added to 100 pounds of nuts in a revolving coating pan. The nuts are tumbled until well coated. Then, 13 pounds of a dry powder blend consisting of 86% by weight sucrose and 14% by weight starch are added to the honey coated nuts while they are still tumbling. After the sugar-starch powder is absorbed onto the nuts and they are tumbling freely, they are roasted in oil at a temperature of between 325° and 350° F. The roasted nuts are then removed from the oil and cooled with moving air. About 0.5% by weight of salt is added to the roasted nuts. The resultant roasted nuts are golden brown in color, ready to be packaged and sealed.

Under certain conditions, particularly where unblanched nuts that still have the skins attached are used, a lower sweetness level and a higher salt content may be desired. This would require a lesser amount of diluted honey and sugar-starch blend. It has been found that even here the preferred ratio of diluted honey to dry blend of sugar-starch applied should be about 1 part diluted honey to 3.27 parts of dry sugar-starch blend by weight.

EXAMPLE 3

100 pounds of peanuts are placed in a revolving coating pan and as the nuts tumble, 3 pounds of a honey coating solution are added. The honey coating solution contains 65% by weight of honey and 35% by weight of water. The soluble solids in the honey solution is 53% by weight. Tumbling of the nuts is continued until all of the nuts are coated evenly. Then, 10 pounds of a dry sugar-starch blend is added to the coating pan. The dry blend comprises 88% by weight of sugar and 12% by weight of starch and the particle size of the sugar ranges between 0.002 and 0.02-inches. The nuts are allowed to continue tumbling until they are evenly coated with the sugar-starch mixture and then are submerged in an oil bath and roasted at a temperature of about 340° F. until the desired roast is obtained. The roasted nuts are air cooled to prevent excessive roasting and are then dusted with a 2% finely ground sugar-salt mixture, based on the weight of the nuts. The sugar-salt blend contains 80% sugar and 20% salt. The roasted nuts are then packaged under vacuum.

We claim:

1. A process for providing a honey coated roasted nut comprising first coating raw nuts with a mixture comprising about 50–80% by weight of honey and from about 20–50% by weight of water, enrobing the honey coated nuts with a dry mixture containing about 84–92% by weight of sugar and about 8–16% by weight of starch, the particle size of the sugar and starch in said dry mixture being in the range of 0.002 inch to 0.02 inch, and thereafter roasting the nuts.

2. A process according to claim 1 wherein said mixture of honey and water comprises from 40–70% by weight of soluble solids.

3. A process according to claim 1 wherein from about 2–5% by weight of the mixture of honey and water based upon the weight of the nuts is used to coat the nuts.

4. A process according to claim 3 wherein from 8–16% by weight of dry mixture of sugar and starch based upon the weight of the nuts is blended with the honey coated nuts.

5. A process according to claim 4 wherein said nuts are roasted by submersion in oil heated to a temperature of about 300°–375° F.

6. A process according to claim 4 wherein said nuts are roasted by placing them on a continuous belt and passing them through an air roaster at a temperature of about 300°–375° F.

7. A process according to claim 4 wherein from about 0.3 to 1.0% by weight of salt based upon the weight of the nuts is added to the roasted nuts.

8. A process according to claim 4 wherein unblanched nuts are used which still contain the skins.

9. A honey coated roasted nut prepared by the process of claim 1.

* * * * *